United States Patent
Cheale et al.

(12)
(10) Patent No.: US 6,272,445 B1
(45) Date of Patent: Aug. 7, 2001

(54) DATA LOGGING

(75) Inventors: Graham Russell Cheale, Christchurch; Andrew Kassell, Bournemouth, both of (GB)

(73) Assignee: Trendview Recorders Limited, Dorset (GB)

(*) Notice: Subject to any disclaimer, the term of this patent is extended or adjusted under 35 U.S.C. 154(b) by 0 days.

(21) Appl. No.: 09/102,896

(22) Filed: Jun. 23, 1998

(30) Foreign Application Priority Data

Jun. 5, 1998 (GB) .................................. 9812166

(51) Int. Cl.⁷ .................................................. G06F 15/00
(52) U.S. Cl. ................................. 702/187; 702/79
(58) Field of Search .............................. 702/79, 176, 187

(56) References Cited

U.S. PATENT DOCUMENTS

| | | |
|---|---|---|
| 3,860,759 | 1/1975 | Miller et al. . |
| 4,372,692 * | 2/1983 | Thomae ............................... 374/104 |
| 4,616,320 | 10/1986 | Kerr et al. . |
| 4,646,241 | 2/1987 | Ratchford et al. . |
| 4,663,628 * | 5/1987 | Duncan et al. ....................... 340/853 |
| 4,718,027 * | 1/1988 | Richardson et al. ................. 364/554 |
| 4,745,564 * | 5/1988 | Tennes et al. ....................... 364/566 |
| 4,910,692 * | 3/1990 | Outram et al. ....................... 364/550 |

FOREIGN PATENT DOCUMENTS

| | | |
|---|---|---|
| 0 201 296 | 11/1986 | (EP) . |
| 2 290 872 | 1/1996 | (GB) . |

OTHER PUBLICATIONS

Kovac, "Efficient Data Compression Algorithm for Data-Loggers, Measurement Equipment and Remote Data Analysis Applications", IEEE, 3/98.*

* cited by examiner

Primary Examiner—Patrick Assouad
(74) Attorney, Agent, or Firm—Nixon & Vanderhye P.C.

(57) ABSTRACT

A logging system 2 is described in which an input signal value is compare by a signal processor 12 to a trigger-band 34 and an inner-band 36 centre about a previously logged value 34 and changing at a previously determined rate of change. When the trigger-band is exceeded at point 40, intermediate points are logged representing the maximum and minimum points since the last logged point and the point at which the inner-band was left. The intermediate points enable a more accurate subsequent reconstruction of the actual signal to be made from the logged values.

16 Claims, 4 Drawing Sheets

DATA LOGGING

BACKGROUND OF THE INVENTION

1. Field of the Invention

This invention relates to data logging. More particularly, this invention relates to data logging systems that store the logged data on a storage medium using data compression by logging a sequence of data values and the times for which they subsist.

2. Description of the Prior Art

It is known from U.S. Pat. No. 4,616,320 to provide a seismic activity logging system in which seismic data is recorded in compressed form into a long term memory comprising an integrated circuit memory. The seismic data is continuously recorded into a buffer memory. If the seismic signals exceed a preset level then the contents of the buffer and any further signals are stored in the long term memory until the seismic signal falls below a preset level for a preset period. The data is stored in compressed form by recording a signal value and a rate of change value starting from the signal value together with a time for which the actual signal remains within a preset tolerance of the value that would be predicted by extrapolating from the signal value with the rate of change value. When the tolerance is exceeded, a new point is recorded. This is analogous to runlength coding.

A problem within the data logging field in general and the above described system is that as the degree of compression increases there is an increase in the loss of detail within the data recorded.

SUMMARY OF THE INVENTION

Viewed from one aspect the invention provides apparatus for logging to a storage medium input signal values as a sequence of logged values and respective time periods for which said logged values subsist, said apparatus comprising:

(i) a trigger-band comparitor for comparing an input signal value with a trigger-band of signal values to determine whether said input signal value is within said trigger-band following a preceding logged value; and (ii) signal processing logic coupled to said trigger-band comparitor and responsive to said input signal value being outside of said trigger-band to trigger logging of a new logged value with a new time period and setting of a new value for said trigger-band, wherein:

(iii) said signal processing logic detects from said input signal value between said preceding logged value and said new logged value one or more intermediate points having predetermined characteristics; and (iv) said signal processing logic additionally logs said intermediate points.

The invention recognises that detail may be preserved without unduly decreasing the compression by seeking to detect one or more intermediate points having predetermined significant characteristics and logging these points.

One example of such a significant characteristic is the point at which the signal was last within an inner-band that is narrower than the trigger-band.

This invention recognises that when gradual changes occur with a signal value, then a loss of detail is not usually significant. Conversely, when a rapid change occurs in a signal value, it is often desirable to store more detailed data representing the change in the signal value as, for example, sudden changes may be the result of faults or unusual conditions which a user will later wish to study in detail This feature exploits this recognition by logging the last point at which the signal was within an inner-band. When a rapid change occurs, extra detail is stored in that the exit point of the inner band tolerance is logged as well as the point at which the trigger band tolerance is exceeded. This additional intermediate point that is logged allows the sharp change in the input signal value to be reconstructed when the data is later analysed (the sharp comer win a signal trace of the data value is kept by logging this additional point).

Other intermediate points that may be logged are the maximum and/or minimum input signal points that preceded the trigger-band being exceeded. This extra detail allows a better reconstruction of the signal to be later made from the compressed logged data.

It will be appreciated that the data may be stored in many different representations. For example, it would be possible to use a differential coding technique in which changes in signal level were recorded rather than absolute values. However, it has been found advantageous to use embodiments in which said logged value includes an initial signal level value of said input signal value. Logging an absolute value in this way allows increased resistance to data corruption and/or data loss in that the input signal values can be reconstructed even if a break occurs within the logged data stream It would be possible to use a compression technique that assumed that the input signal values remained constant other than at the points at which changes within them were logged. However, improved data compression and a better representation of the actual signal values may be recorded in embodiments in which said logged value includes a rate of change value of said input signal value. In such embodiments the assumption is that the signal value is changing at a uniform rate and that only significant deviations from what would be expected are recorded (or the maximum time period of validity for a logged sample value within the data format is exceeded). This has been found to give superior data compression and more accurate reconstruction of real life signals.

When the data compression model includes a rate of change value, then the period of validity of the logged values can be increased and so data compression efficiency increased in embodiments in which said trigger band and said inner band are updated to change in accordance with said rate of change value. In this way, the tolerance bands applied to triggering the recording of new data are extrapolated in the same way as the stored data value.

The construction of the system is simplified in embodiments in which said input signal value is sampled at a predetermined rate.

In order to enable the system to be adapted to different situations it is desirable that the predetermined rate is a user set parameter.

When a fixed sampling rate is used, then the time period logged can be expressed as a number of sample periods. The periodic insertion of a time stamp giving an absolute time value is also useful for reconstruction from the data.

The values logged each time the trigger band tolerance is exceeded could be values representing the signal that had just passed, values giving at least a partial prediction of the signal to come or a mixture of both. However, in preferred emubodiments of the invention said new logged value and said new time period represent said input signal value that subsisted from a time corresponding to an immediately preceding logged point to a time corresponding to logging of said new logged value and new time period.

At the time at which the trigger band tolerance is exceeded, the signal value that previously subsisted (comprising a level and a rate of change) together with the number of sampling periods for which that value was valid is determined and so can be logged as one self-contained data unit.

It will be appreciated that it is possible that the inner band could be disposed asymmetrically win the wide band, but in most real life physical situations the best performance is achieved when said inner band is centrally located within said wide band.

In order to facilitate the setting up of the logging system by a user, it is preferred that said inner band has a width that is user set as a percentage of the width of said trigger band.

Various different storage media could be used, such as a solid state integrated circuit memory module (e.g. RAM) or a magnetic tape. However, in preferred embodiments of the invention the storage medium is a computer readable medium Using such a medium (e.g. a computer diskette, ZIP drive, removable hard drive, DAT tape etc) allows the logged information to be readily analysed by a standard PC that already has a mechanism for reading such a median.

The apparatus may also be formed as a computer linked via a telecommunications link to a sensor. Ie remote computer then performs the role of the signal processor and competitors on the received data.

In a similar way as the inner-band has a width that is set as a percentage, the trigger band may be conveniently set up by a user as a percentage of the input signal value.

Viewed from another aspect the present invention provides a method of logging to a storage medium input signal values as a sequence of logged values and respective time periods for which said logged values subsist, said method comprising the steps of:

(i) comparing an input signal value with a trigger band of signal values to determine whether said input signal value is within said trigger-band; and (ii) in response to said input signal value being outside of said trigger-band, triggering logging of a new logged value with a new time period and setting of a new value for said trigger-band, said method further comprising the step of;

(iii) detecting from said input signal value between said preceding logged value and said new logged value one or more intermediate points having predetermined characteristics; and (iv) additionally logging said intermediate points.

The above, and other objects, features and advantages of this invention will be apparent from the following detailed description of illustrative embodiments which is to be read in connection with the accompanying drawings.

BRIEF DESCRIPTION OF THE DRAWINGS

An embodiment of the invention will now be described, by way of example only, with reference to the accompanying drawings, in which.

DESCRIPTION OF THE PREFERRED EMBODIMENTS

Figure 1:
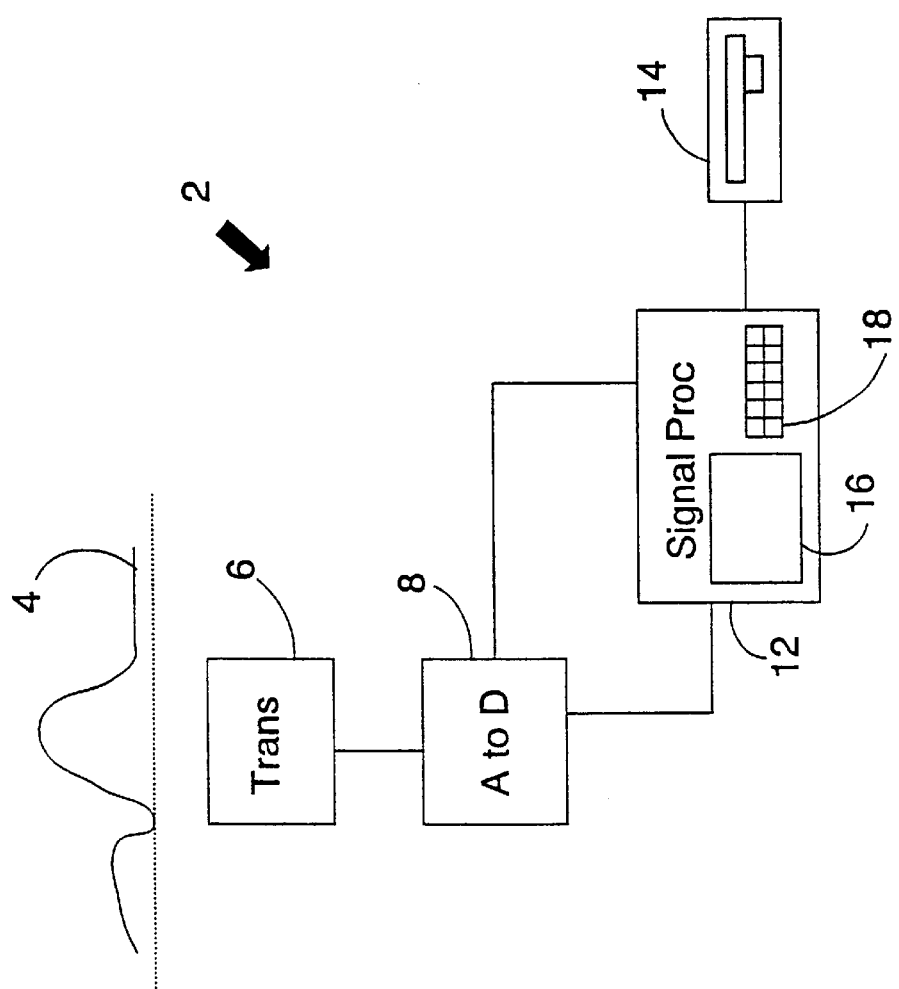
FIG. 1 schematically illustrates a data logging system.

FIG. 1 illustrates a data logging system 2 for logging an input signal value 4. A transducer 6 converts the input signal value into an electrical signal that is supplied to an analog-to-digital converter 8. The output from the analog-to-analog converter 8 is supplied to a signal processor 12. The sampling rate of the analog-to-analog converter 8 is controlled by a signal processor 12. The signal processor 12 also processes, compresses and logs the stored digital sample values. The data values logged are recorded upon a computer diskette within a diskette drive 14.

The signal processor 12 incorporates a general purpose microprocessor operating under software control that co-ordinates the activities of the other elements of the data logging system 2. The signal processor also drives a display 16 and is responsive to user input keys 18. The display 16 can be used to provide a visual indication of the current input signal value as well as a trace of its variation over time, warnings, normal and abnormal bands, etc. The user input keys 18 can be used to call up different displays and to set user defined parameters for the operation of the signal logging system 2.

The sampling frequency of the analog-to-digital converter 8 may be adjusted using the user input keys 18 and the signal processor 12.

Figure 2:
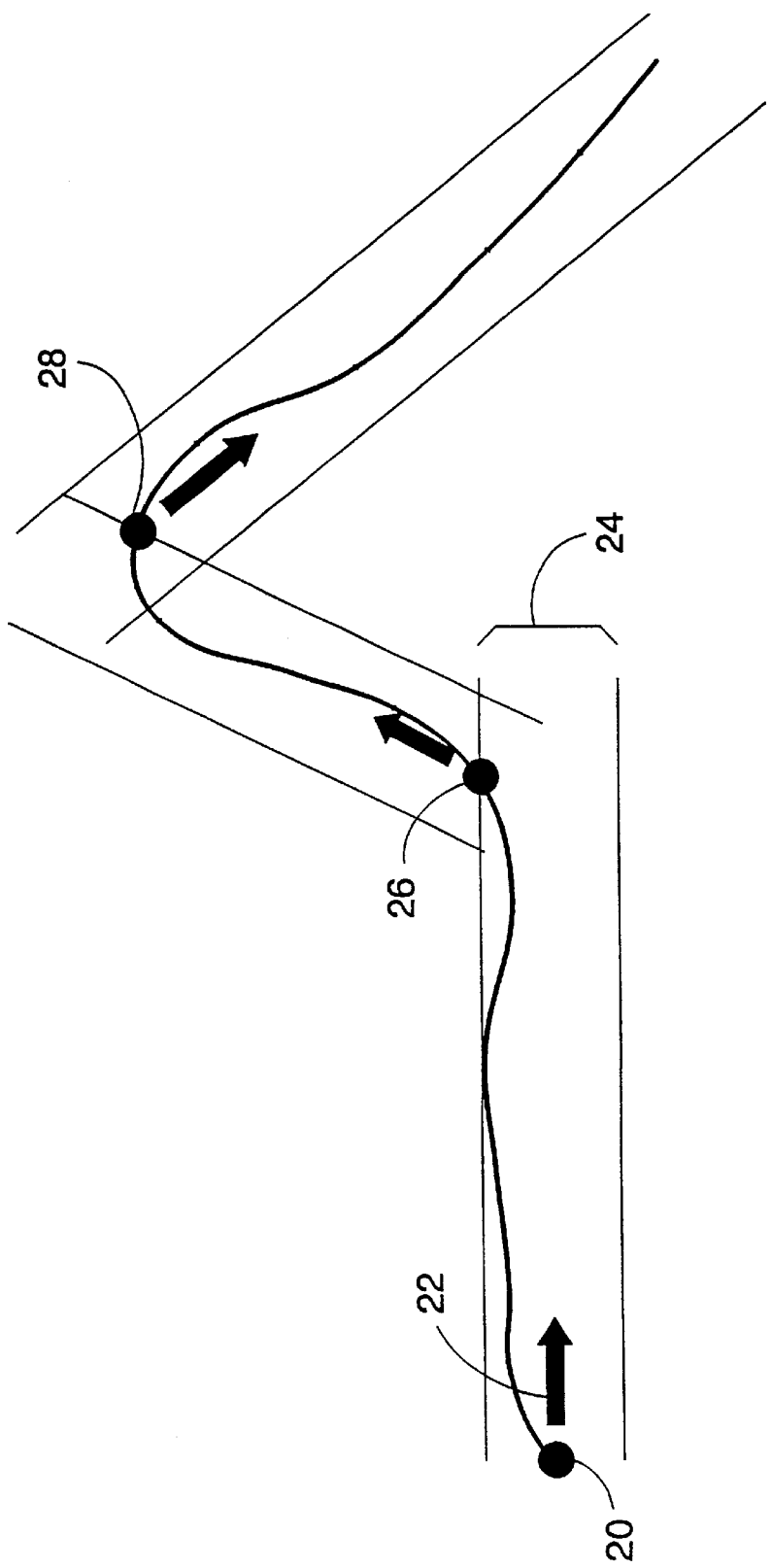
FIG. 2 illustrates a compression technique for use in a data logging system.

FIG. 2 illustrates the principle of the data compression technique applied to the logged data values. An initial input signal level 20 and a rate of change value 22 are recorded. Associated with these values is a tolerance band 24. The tolerance band moves in accordance with the rate of change value 22. The input signal value is periodically sampled at a predetermined sampling frequency (sampling points not shown) until a point is found at which the input signal value exceeds the tolerance band 24. In this example, this occurs at point 26. At point 26, the number of sampled periods for which the first input signal level 20 and the rate of change value 22 validly subsisted is known and this can be recorded together with these first values as a data unit so that in an approximate reconstruction of the input signal value can be made at a later time. In this embodiment, it has been found desirable to use a single byte to record the number of time periods for which an initial value subsists and accordingly the maximum number of time periods before a new value is recorded is 256, Le. a new value will be recorded after 256 intervals even if the tolerance band has not been exceeded. If more bytes were used to store the time period or a variable number of bytes used, then the time period could have a much greater value.

At point 26, a new initial input signal level value is stored together with a new rate of change value. In this case, it will be clearly seen how the tolerance band minimum and maximum points increase in accordance with the rate of change value as time progresses. At point 28, the input signal value again falls outside of the tolerance band and so a new point is stored (in practice the point before the breach). It will be appreciated that this type of coding is in some ways similar to rim length coding modified in that the rims can have a constant rate of change associated where then The angle between the point where the breach occurred and the preceding point is used to calculate the new rate of change vale.

The tolerance band 24 may be set as a percentage of the input signal level The narrower the tolerance band 24 is made, the more frequently will the input signal level fill outside the tolerance band and so a larger number of points be stored Whilst this reduces the degree of data compression, it also increases the resolution of the signal that can be reconstructed from the stored data. The unit may be initially supplied with a preset value (e.g. 1.5% of the signal value) that will allow data to be logged without any user setup. User setup can then take place later when experience has been gained of the type of results that will be generated.

Figure 3:
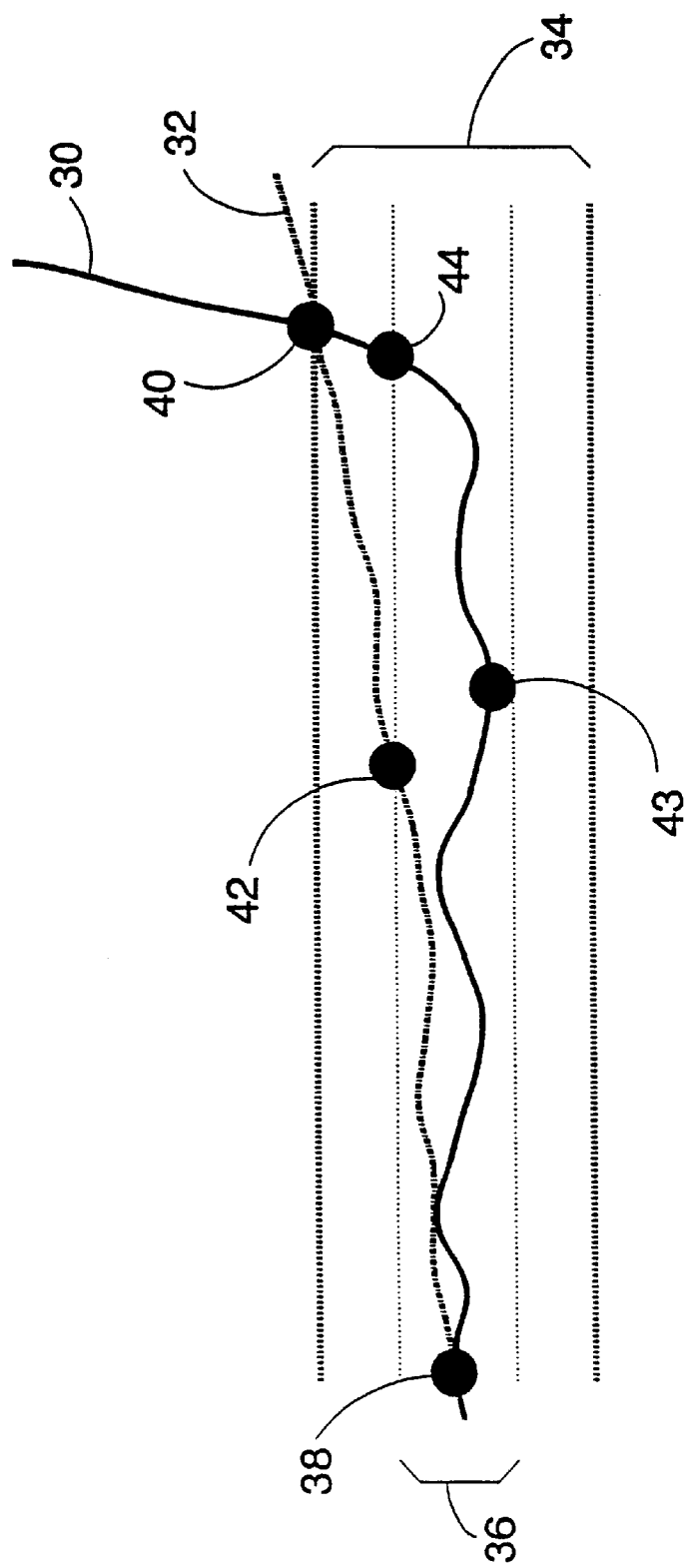
FIG. 3 illustrates a trigger-band and an inner-band for use in determining the points to be logged within a data logging system.

FIG. 3 illustrates two possible input signal values 30, 32 and how they produce different results when trigger-band and inner-band tolerances are employed together. The trigger-band tolerance 34 and the inner-band tolerance 36 are initially centred upon a first point 38. The inner-tolerance band 36 may be user set as a percentage of the trigger-tolerance band 34.

The signal 32 gradually increases until it exits the trigger-tolerance band 34 at point 40. At this point, the point 42 at which the inner-band was left is logged and if different, the point 40 at which the trigger band was left is also logged. In the case of a rapidly changing signal 30 this captures the "corner" of the signal change.

As a rolling process, the signal processor 12 also stores an indication of the position and value of the maximum and minimum 43 signal values that have occurred since the last point was logged. The maxi and/or minm points are also logged as intermediate points when the trigger-band is left. Ie signal between point 38 and point 40 is broken down into a sequence of segments linking the points via any intermediate points 43.

Figure 4:
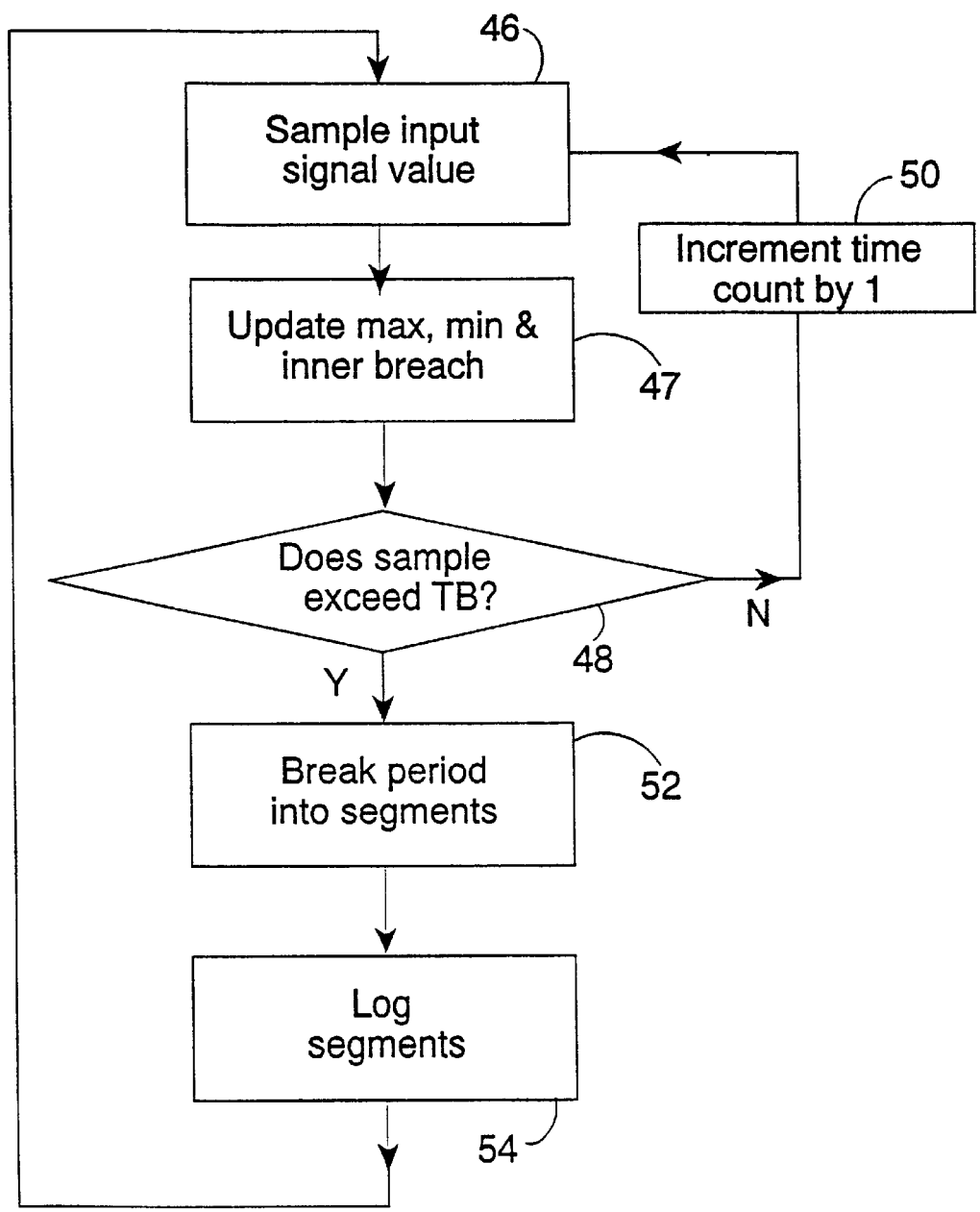
FIG. 4 is a flow diagram illustrating the operation of the system of FIG. 1 in determining which points are to be logged.

FIG. 4 is a flow diagram illustrating the operation of the signal processor 12 in accordance with the sampling technique discussed in FIG. 3. At step 46 the input signal value is sample by the transducer 6 and the analog-to-digital converter 8. At step 47 any necessary updates are made to the currently stored points representing the maximum and minimum values since the last logged point and the latest point at which the inner band 36 was left. At step 48 a test is made to determine if the latest sampled value falls outside the trigger-band tolerance. If this test is negative, then the time period of validity for the previously stored sample is incremented by one sampling period at step 50 and the processing is returned to step 46.

If the result of the test of steep 48 is positive, then the signal processor 12 reads the stored intermediate point data and breaks down the signal sincere the last logged point into segments linking these intermediate points at step 52. These segments are then logged at step 54 before processing returns to step 46.

Although illustrative embodiments of the invention have been described in detail herein with reference to the accompanying drawings, it is to one understood that the invention is not limited to those precise embodiments, and that various changes and modifications can be effected therein by one skilled in the art without departing from the score and spirit of the invention as defined by the appended claims.

We claim:

1. Apparatus for logging to a storage medium input signal values as a sequence of logged values and respective time periods for which said logged values subsist, said apparatus comprising:
   (i) a trigger-band comparitor for comparing an input signal value with a trigger-band of signal values to determine whether said input signal value is within said trigger-band following a preceding logged value; and
   (ii) signal processing logic coupled to said trigger-band comparitor and responsive to said input signal value being outside of said trigger-band to trigger logging of a new logged value with a new time period and setting of a new value for said trigger-band, said signal processing logic including an inner-band comparitor for comparing said input signal value with an inner-band of signal value to determine whether said signal value is within said inner band, wherein:
   (iii) said signal processing logic detects from said input signal value between said preceding logged value and said new logged value one or more intermediate points having predetermined characteristics and detects that most recent point at which said input signal value was within said inner-band preceding said new logged value and logs said point as one of said intermediate points; and
   (iv) said signal processing logic additionally logs said intermediate points.

2. Apparatus as claimed in claim 1, wherein said signal processing logic detects a minimum signal value point between said preceding logged value and said new logged value and logs said point as one of said intermediate points.

3. Apparatus as claimed in claim 1, wherein said signal processing logic detects a minimum signal value point between said preceding logged value and said new logged value and logs said point as one of said intermediate points.

4. Apparatus as claimed in preceding claim 1, wherein said logged value includes an initial signal level value of said put signal value.

5. Apparatus as claimed in claim 1, wherein said logged value includes a rate of change value of said input signal value.

6. Apparatus as claimed in claim 5, wherein said trigger band is updated to change in accordance with said rate of change value.

7. Apparatus for logging to a storage medium input signal values as a sequence of logged values and respective time periods for which said logged values subsist, said apparatus comprising:
   (i) a trigger-band comparitor for comparing an input signal value with a trigger-band of signal values to determine whether said input signal value is within said trigger-band following a preceding logged value; and
   (ii) signal processing logic coupled to said trigger-band comparitor and responsive to said input signal value being outside of said trigger-band to trigger logging of a new logged value with a new time period and setting of a new value for said trigger-band, wherein:
   (iii) said signal processing logic detects from said input signal value between said preceding logged value and said new logged value one or more intermediate points having predetermined characteristics; and
   (iv) said signal processing logic additionally logs said intermediate points, wherein said logged value includes a rate of change value of said input signal value, wherein said trigger band is updated to change in accordance with said rate of change value, said signal processing logic includes an inner-band comparitor for comparing said input signal value with an inner-band of signal value to determine whether said signal value is within said inner band; and
   said signal processing logic detects that most recent point at which said input signal value was within said inner-band preceding said new logged value and logs said point as one of said intermediate points; and
   wherein said inner-band is updated to change in accordance with said rate of change value.

8. Apparatus as claimed in claim 1, wherein said input signal value is sampled at a predetermined rate.

9. Apparatus as claimed in claim 8, wherein said predetermined rate is a user set parameter.

10. Apparatus as claimed in claim 4, wherein said time period is stored as a number of sampling periods for which said logged value subsists.

11. Apparatus as claimed in claim 1, wherein said new logged value and said new time period represents said input signal value that subsisted from a time corresponding to an immediately preceding logged point to a time corresponding to logging of said new logged value and new time period.

12. Apparatus for logging to a storage medium input signal values as a sequence of logged values and respective time periods for which said logged values subsist, said apparatus comprising:

(i) a trigger-band comparitor for comparing an input signal value with a trigger-band of signal values to determine whether said input signal value is within said trigger-band following a preceding logged value; and (ii) signal processing logic coupled to said trigger-band comparitor and responsive to said input signal value being outside of said trigger-band to trigger logging of a new logged value with a new time period and setting of a new value for said trigger-band, wherein:

(iii) said signal processing logic detects from said input signal value between said preceding logged value and said new logged value one or more intermediate points having predetermined characteristics; and (iv) said signal processing logic additionally logs said intermediate points, wherein said signal processing logic detects a maximum signal value point between said preceding logged value and said new logged value and logs said point as one of said intermediate points, said signal processing logic includes an inner-band comparitor for comparing said input signal value an inner-band of signal value to determine whether said signal value is within said inner band; and said signal processing logic detects that most recent point at which said input signal value was within said inner-band preceding said new logged value and logs said point as one of said intermediate points; and wherein said inner-band is centrally located within said trigger-band.

13. Apparatus for logging to a storage medium input signal values as a sequence of logged values and respective time periods for which said logged values subsist, said apparatus comprising:

(i) a trigger-band comparitor for comparing an input signal value with a trigger-band of signal values to determine whether said input signal value is within said trigger-band following a preceding logged value; and (ii) signal processing logic coupled to said trigger-band comparitor and responsive to said input signal value being outside of said trigger-band to trigger logging of a new logged value with a new time period and setting of a new value for said trigger-band, wherein:

(iii) said signal processing logic detects from said input signal value between said preceding logged value and said new logged value one or more intermediate points having predetermined characteristics; and (iv) said signal processing logic additionally logs said intermediate points, wherein said signal processing logic detects a maximum signal value point between said preceding logged value and said new logged value and logs said point as one of said intermediate points, said signal processing logic includes an inner-band comparitor for comparing said input signal value with an inner-band of signal value to determine whether said signal value is within said inner band;

said signal processing logic detects that most recent point at which said input signal value was within said inner-band preceding said new logged value and logs said point as one of said intermediate points; and wherein said inner-band has a width that is user set as a percentage of the width of said trigger-band.

14. Apparatus as claimed in claim 1, wherein said storage medium is a computer readable medium.

15. Apparatus as claimed in claim 1, wherein the width of said trigger-band is user set as a percentage of said input signal value.

16. A method of logging to a storage medium input signal values as a sequence of logged values and respective time periods for which said logged values subsist, said method comprising the steps of:

(i) comparing an input signal value with a trigger band of signal values to determine whether said input signal value is within said trigger-band; and (ii) in response to said input signal value being outside of said trigger-band, triggering logging of a new logged value with a new time period and setting of a new value for said trigger-band including the step of comparing said input signal value with an inner band of signal value to determine whether said signal value is within said inner band, (iii) detecting from said input signal value between said preceding logged value and said new logged value one or more intermediate points having predetermined characteristics and detecting the most recent point at which said input signal value was within said inner-band preceding said new logged value and, if so, logging said most recent point as one of said intermediate points; and (iv) additionally logging said intermediate points.

* * * * *